(12) United States Patent
Park et al.

(10) Patent No.: US 8,603,683 B2
(45) Date of Patent: Dec. 10, 2013

(54) GAS PHASE DEPOSITION OF BATTERY SEPARATORS

(71) Applicant: Enevate Corporation, Irvine, CA (US)

(72) Inventors: Benjamin Yong Park, Mission Viejo, CA (US); Alexander Gorkovenko, Mission Viejo, CA (US); Rabih Bachir Zaouk, Venice, CA (US); William Hubert Schank, Jr., Howell, MI (US)

(73) Assignee: Enevate Corporation, Irvine, CA (US)

( * ) Notice: Subject to any disclaimer, the term of this patent is extended or adjusted under 35 U.S.C. 154(b) by 0 days.

(21) Appl. No.: 13/740,050

(22) Filed: Jan. 11, 2013

(65) Prior Publication Data

US 2013/0130120 A1    May 23, 2013

Related U.S. Application Data

(63) Continuation of application No. 12/728,157, filed on Mar. 19, 2010, now abandoned.

(60) Provisional application No. 61/161,740, filed on Mar. 19, 2009, provisional application No. 61/168,194, filed on Apr. 9, 2009, provisional application No. 61/226,217, filed on Jul. 16, 2009.

(51) Int. Cl.
*H01M 6/16* (2006.01)

(52) U.S. Cl.
USPC ........... 429/332; 429/330; 429/329; 429/327; 429/326

(58) Field of Classification Search
None
See application file for complete search history.

(56) References Cited

U.S. PATENT DOCUMENTS

| | | |
|---|---|---|
| 3,830,733 A * | 8/1974 | Spivack et al. ............... 210/646 |
| 3,940,362 A | 2/1976 | Overhults |
| 5,089,360 A | 2/1992 | Kanno et al. |
| 5,093,197 A | 3/1992 | Howard et al. |
| 5,126,219 A | 6/1992 | Howard et al. |
| 5,230,843 A | 7/1993 | Howard et al. |
| 5,230,949 A | 7/1993 | Howard et al. |
| 5,314,765 A | 5/1994 | Bates |
| 5,332,906 A | 7/1994 | Lauf et al. |
| 5,338,625 A | 8/1994 | Bates et al. |
| 5,455,126 A | 10/1995 | Bates et al. |
| 5,512,147 A | 4/1996 | Bates et al. |
| 5,561,004 A | 10/1996 | Bates et al. |

(Continued)

FOREIGN PATENT DOCUMENTS

WO       WO 92/09651        6/1992

OTHER PUBLICATIONS

"Applications: Free Radical Initiators", Polymer Products from Aldrich.

(Continued)

*Primary Examiner* — Patrick Ryan
*Assistant Examiner* — Yoshitoshi Takeuchi
(74) *Attorney, Agent, or Firm* — Knobbe, Martens, Olson & Bear LLP

(57) ABSTRACT

In certain embodiments, a battery component comprises an electrode and a separator deposited on a surface of the electrode is provided. The separator comprises a porous poly (para-xylylene) film. In some embodiments, the electrode can include at least one cavity or protrusion, and the separator layer can be gas phase deposited directly on the electrode. In certain embodiments, methods of making a battery component are also provided.

4 Claims, 6 Drawing Sheets

(56) References Cited

U.S. PATENT DOCUMENTS

| | | | |
|---|---|---|---|
| 5,567,210 A | 10/1996 | Bates et al. | |
| 5,569,520 A | 10/1996 | Bates | |
| 5,597,660 A | 1/1997 | Bates et al. | |
| 5,612,152 A | 3/1997 | Bates | |
| 5,786,396 A | 7/1998 | Takita et al. | |
| 5,830,554 A | 11/1998 | Kaimai et al. | |
| 5,853,633 A | 12/1998 | Kono et al. | |
| 5,922,492 A | 7/1999 | Takita et al. | |
| 6,057,060 A | 5/2000 | Yu | |
| 6,080,507 A | 6/2000 | Yu | |
| 6,123,993 A | 9/2000 | Xu et al. | |
| 6,132,654 A | 10/2000 | Yu | |
| 6,180,280 B1 | 1/2001 | Spotnitz | |
| 6,245,272 B1 | 6/2001 | Takita et al. | |
| 6,322,923 B1 | 11/2001 | Spotnitz et al. | |
| 6,425,993 B1 * | 7/2002 | Debe et al. | 204/296 |
| 6,432,586 B1 | 8/2002 | Zhang | |
| 6,566,012 B1 | 5/2003 | Takita et al. | |
| 6,602,593 B1 | 8/2003 | Callahan et al. | |
| 6,666,969 B1 | 12/2003 | Funaoka et al. | |
| 6,749,961 B1 | 6/2004 | Nguyen et al. | |
| 6,824,865 B1 | 11/2004 | Funaoka et al. | |
| 6,881,515 B2 | 4/2005 | Wensley | |
| 6,946,405 B2 | 9/2005 | Takahashi et al. | |
| 7,323,207 B2 | 1/2008 | Nichols et al. | |
| 7,479,243 B2 | 1/2009 | Funaoka et al. | |
| 2005/0014388 A1 | 1/2005 | Takahashi et al. | |
| 2005/0031941 A1 | 2/2005 | Zhang et al. | |
| 2005/0058823 A1 | 3/2005 | Funaoka et al. | |
| 2005/0098913 A1 | 5/2005 | Funaoka et al. | |
| 2005/0202163 A1 | 9/2005 | Nguyen et al. | |
| 2005/0244717 A1 | 11/2005 | Zhang et al. | |
| 2005/0287425 A1 | 12/2005 | Shi et al. | |
| 2006/0046044 A1 | 3/2006 | Lee et al. | |
| 2006/0088769 A1 | 4/2006 | Arora et al. | |
| 2007/0072068 A1 | 3/2007 | Zhang et al. | |
| 2007/0072069 A1 | 3/2007 | Yamada et al. | |
| 2007/0221567 A1 | 9/2007 | Simmons et al. | |
| 2007/0238017 A1 | 10/2007 | Call et al. | |
| 2007/0264483 A1 | 11/2007 | Ozaki et al. | |
| 2007/0264578 A1 | 11/2007 | Ozaki et al. | |
| 2008/0241593 A1 * | 10/2008 | Hasebe | 428/704 |
| 2009/0008816 A1 | 1/2009 | Takita et al. | |
| 2009/0042008 A1 | 2/2009 | Kimishima et al. | |
| 2009/0079102 A1 | 3/2009 | Takita et al. | |
| 2009/0087749 A1 | 4/2009 | Takita et al. | |
| 2009/0087750 A1 | 4/2009 | Takita et al. | |
| 2009/0092893 A1 | 4/2009 | Takita et al. | |
| 2009/0098341 A1 | 4/2009 | Takita et al. | |
| 2009/0098449 A1 | 4/2009 | Funaoka et al. | |
| 2009/0098450 A1 | 4/2009 | Kikuchi et al. | |
| 2009/0117453 A1 | 5/2009 | Kikuchi et al. | |
| 2009/0117455 A1 | 5/2009 | Takita et al. | |
| 2009/0127733 A1 | 5/2009 | Takita et al. | |
| 2009/0134538 A1 | 5/2009 | Takita et al. | |
| 2009/0146334 A1 | 6/2009 | Takita et al. | |
| 2009/0148761 A1 | 6/2009 | Kikuchi et al. | |
| 2009/0170005 A1 | 7/2009 | Kimishima et al. | |
| 2009/0253032 A1 | 10/2009 | Takita et al. | |
| 2009/0269656 A1 | 10/2009 | Takita et al. | |
| 2009/0269672 A1 | 10/2009 | Takita et al. | |
| 2009/0286161 A1 | 11/2009 | Takita et al. | |
| 2010/0003591 A1 | 1/2010 | Takita et al. | |
| 2010/0021808 A1 | 1/2010 | Takita et al. | |
| 2010/0255376 A1 | 10/2010 | Park et al. | |
| 2011/0236745 A1 | 9/2011 | Brant et al. | |

OTHER PUBLICATIONS

Daniel, Materials and Processing for Lithium-Ion Batteries, 43-48 JOM 60-9 (2008).

Erjavec et al., "Novel Parylene-N films deposited at liquid nitrogen temperatures", Materials Letters, 1999, vol. 39, pp. 339-342, Tempe, AZ, USA.

Fortin et al., "A Model for the Chemical Vapor Deposition of Poly(para-xylylene) (Parylene) Thin Films", Chemistry of Materials, 2002, vol. 14, Issue 5, pp. 1945-1949, Troy, New York, USA.

Schafer, J et al., Local deposition of SiOx plasma polymer films by a miniaturized atmospheric pressure plasma jet (APPJ), J. Phys. D; Appl. Phys., Sep. 15, 2008, vol. 41, pp. 1-9, United Kingdom.

Yang, et al., "High deposition rate parylene films", Journal of Crystal Growth, 1998, vol. 183, pp. 385-390, Troy, New York, USA.

Yeh et al., "Polymerization of Para-xylylene Derivatives. VI. Morphology of Parylene N and Parylene C Films Investigated by Gas Transport Characteristics", Journal of Polymer Science: Part B: Polymer Physics, 1990, vol. 28, pp. 545-568, Columbia, MO, USA.

U.S. Appl. No. 60/419,567, filed on Oct. 21, 2002 entitled Method and Apparatus for Fingerprint Detection.

* cited by examiner

GAS PHASE DEPOSITION OF BATTERY SEPARATORS

CROSS-REFERENCE TO RELATED APPLICATIONS

This application is a continuation of U.S. patent application Ser. No. 12/728,157, filed Mar. 19, 2010, now abandoned, which claims the benefit of U.S. Provisional Application Nos. 61/161,740, filed Mar. 19, 2009, 61/168,194, filed Apr. 9, 2009, and 61/226,217, filed Jul. 16, 2009, the entirety of each of which is hereby incorporated by reference.

BACKGROUND

1. Field

Embodiments of the present disclosure relate to battery separators. In particular, further embodiments relate to deposition of battery separators.

2. Description of the Related Art

A battery typically includes a separator and/or electrolyte between an anode and a cathode. FIG. 1 illustrates a separator 13 sandwiched between an anode 14 and a cathode 12. FIG. 1 further illustrates a load 11 electrically connected to the anode 14 and the cathode 12 to form a battery 10 in a discharge configuration. The load can be replaced with a charger to have the battery 10 in a charging configuration. In one class of batteries, the separator is generally a film material, made of an electrically insulating polymer that prevents electrons from flowing from anode to cathode. Separators are porous to allow ions to pass through the separator. Typically, the separator, cathode and anode materials are individually formed into sheets, films, or active material coated foils. Sheets of the cathode, separator and anode are subsequently stacked or rolled with the separator separating the cathode and anode to form the battery. A separator in prior art batteries is a sheet and therefore, is limited to specific manufacturing methods (e.g., mainly winding methods and stacking). In these methods, the anodes and cathodes (e.g., electrodes) are usually films.

SUMMARY

In certain embodiments, a method of making a battery separator includes gas phase depositing a composition onto an electrode. The composition comprising a first component selected from the group consisting of polymers, dimers and monomers, and a second component selected from the group consisting of polymers, dimers and monomers. The first component being different than the second component. The first component and the second component each form separate polymer phases and together form a layer. The method further includes removing at least a portion of the second component to form a porous separator layer. In certain embodiments, the method further includes activating a first dimer and pyrolysing the first dimer to form the first component, and activating a second dimer and pyrolysing the second dimer to form the second component.

In further embodiments, a method of making a battery separator includes gas phase depositing a composition onto an electrode. The composition comprising a first component selected from the group consisting of polymers, dimers and monomers. The method further includes forming a first polymer from the first component to form a layer comprising the first polymer and a second component selected from the group consisting of by-products and remaining portions of the first component from the forming the first polymer. The method also further includes removing at least a portion of the second component to form a porous separator layer.

In one embodiment, a method of making a battery separator includes forming a first layer onto an electrode, the first layer comprising a porous template, and gas phase depositing a first component into the porous template. The porous template can include a removable material. The first component selected from the group consisting of polymers, dimers and monomers. The method further includes removing at least a portion of the porous template to form a porous separator layer comprising the first component.

In some embodiments, a method of making a battery separator includes gas phase depositing a composition onto an electrode. The composition comprises a precursor and a foaming agent. The method further includes evaporating the foaming agent to foam the precursor, and polymerizing the precursor to form a porous separator layer.

In an embodiment, a battery separator having a gas phase deposited porous separator is provided. In some embodiments, the porous separator has an open cell structure. In further embodiments, the porous separator comprises parylene.

In one embodiment, a battery separator includes a gas phase deposited nonporous separator, wherein the nonporous separator can absorb a liquid electrolyte is provided. In some embodiments, the nonpourous separator can be gelled.

In another embodiment, a battery includes a gas phase deposited separator deposited on an electrode is provided. The gas phase deposited separator can be a polymer. The electrode can be a material that reacts with or absorbs ions. In some embodiments, the electrode comprises carbon. The battery can be a lithium ion battery or a fluoride battery. In some embodiments, the gas phase deposited separator comprises an open cell structure.

In a further embodiment, a battery electrode and separator includes an electrode comprising at least one cavity or protrusion on at least one surface of the electrode. The cavity or protrusion can have a length greater than about 5 mils and at least one width that is less than about 5 mils. The battery electrode and separator further includes a substantially conformal separator layer gas phase deposited onto a surface of the at least one cavity or protrusion. In certain embodiments, the length of the cavity or protrusion is between about 5 and 100 mils, and the at least one width of the cavity or protrusion is between about 1 and 5 mils.

DETAILED DESCRIPTION

Figure 1:
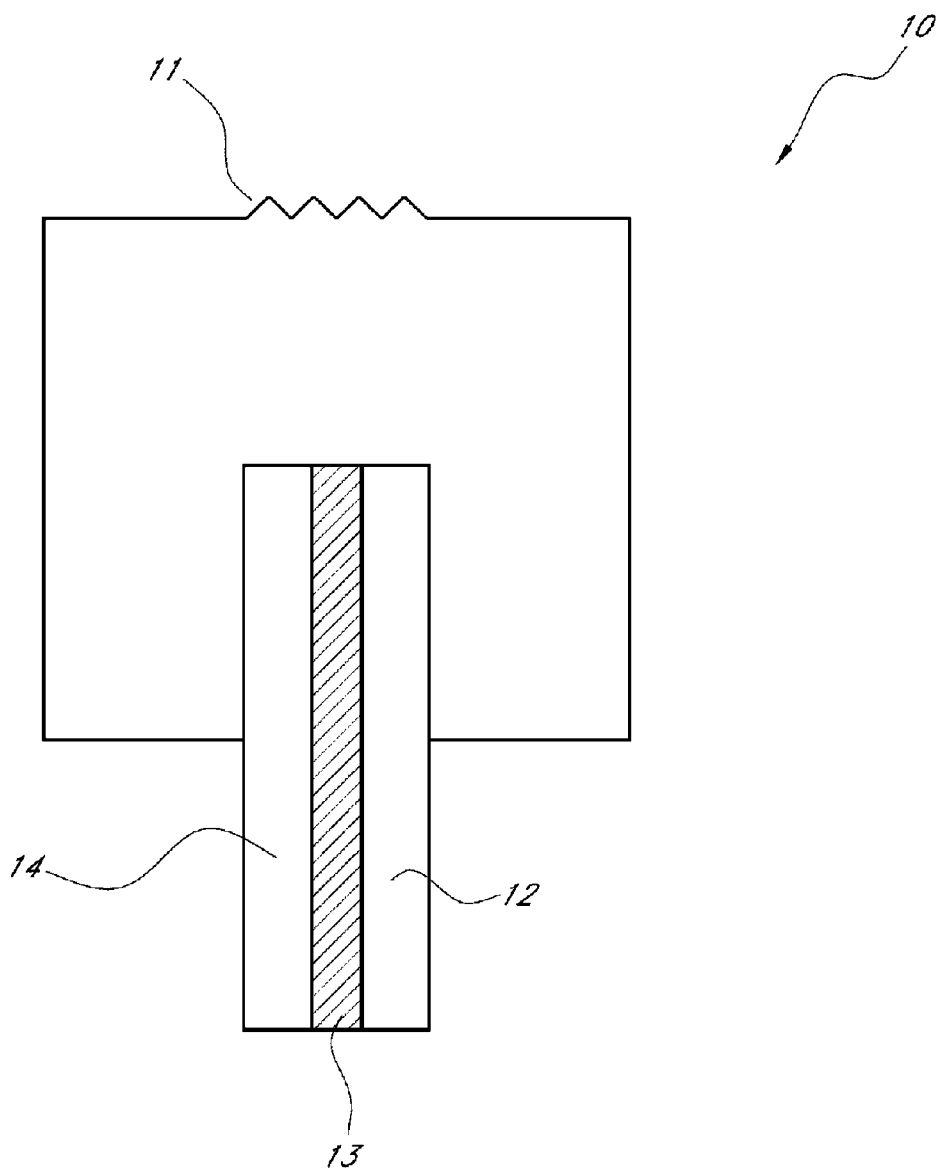
FIG. 1 illustrates a separator sandwiched between an anode and a cathode to form a battery.
Figure 2:
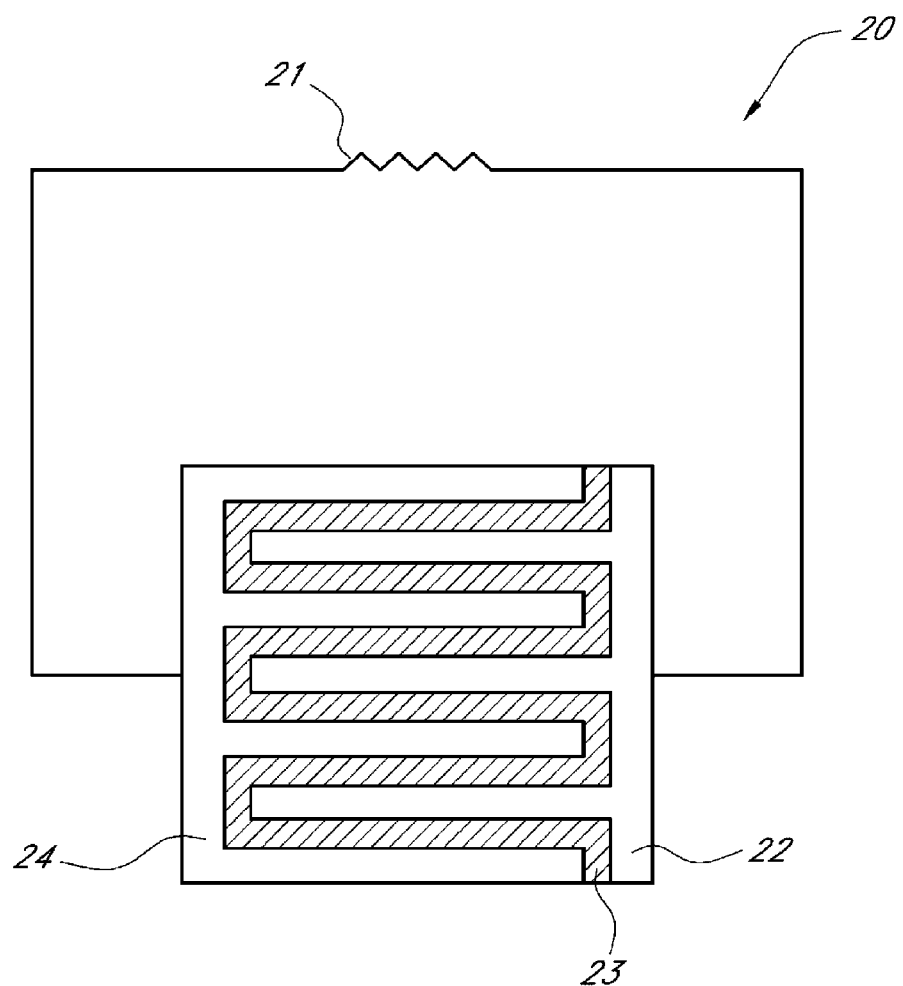
FIG. 2 illustrates a separator deposited onto a complex shaped first electrode with a second electrode deposited onto or sandwiched against the separator to form a battery.

To be able to build a battery with film type electrodes and/or more complex shaped electrodes, another technique to produce the separator is described herein. By using a complex shaped electrode, the electrode may not need to be rolled as in a conventional wound battery to provide sufficient surface area between the electrodes and the separator. Therefore, electrode materials that may not have sufficient deformability to be able to be rolled may be used. For example, carbon in a solid form (e.g. not carbon powder with a binder) can be used. In some embodiments, the separator is deposited onto an electrode (e.g. cathode or anode). Advantageously, a deposited separator can be deposited on complex shaped electrodes. For example, FIG. 2 illustrates a separator 23 that can be deposited onto a complex shaped first electrode that including either an anode 24 or a cathode 22. A second electrode can be deposited onto the separator 23 or can be sandwiched against the separator 23. For example, the first electrode can have a deposited separator 23 which can then be fitted, mated, or coupled together with the second electrode. The first electrode and second electrode can be configured to sandwich the separator when fitted, mated, or coupled together. A battery 20 can be formed from the separator 23, anode 24 and cathode 22. Furthermore, the battery can be put into a discharge configuration by putting a load 21 into electrical communication with the anode 24 and cathode 22 or can be put into a charge configuration by putting a charger into electrical communication with the anode 24 and cathode 22.

The parameters of deposition can be adjusted to deposit a separator with porosity. The porosity of the separator can be adjusted for optimal performance of the battery. For example, the morphology, size, shape, volume percent, etc. can be adjusted. In one embodiment, the separator has an open cell structure. In some embodiments, gas phase deposition can be used to deposit the separator. The separator can be a separator in a lithium ion battery or a fluoride ion battery. In some embodiments, the anode can be a material that reacts with or absorbs ions (e.g. battery active material). In one embodiment, carbon can be used as the anode and the separator can be deposited directly on the carbon. Depositing paraxylylene film on carbon is discussed in United States Patent Publication No. 2008/0241593. Some embodiments include depositing a polymer that is any of one or more of the group of polymers, dimers or monomers which can be deposited in a conformal coating by vapor deposition, chemical vapor deposition, initiated chemical vapor deposition, fumed deposition, etc. Process parameters can be selected to produce a conformal separator layer on a non-planar surface.

In some embodiments, the battery includes a liquid or gel electrolyte. The separator preferably does not dissolve in typical battery electrolytes such as compositions that include: Ethylene Carbonate (EC), Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, and $LiClO_4$ etc. In some embodiments, the separator is wet or soaked with a liquid or gel electrolyte. In addition, the separator preferably does not melt below about 100 to 120° C. The separator should also have sufficient mechanical properties. A battery, in operation, can experience expansion and contraction of the anode and/or the cathode. Preferably, the separator can expand and contract by at least about 5 to 10% without failing. The separator can also be flexible.

Figure 3:
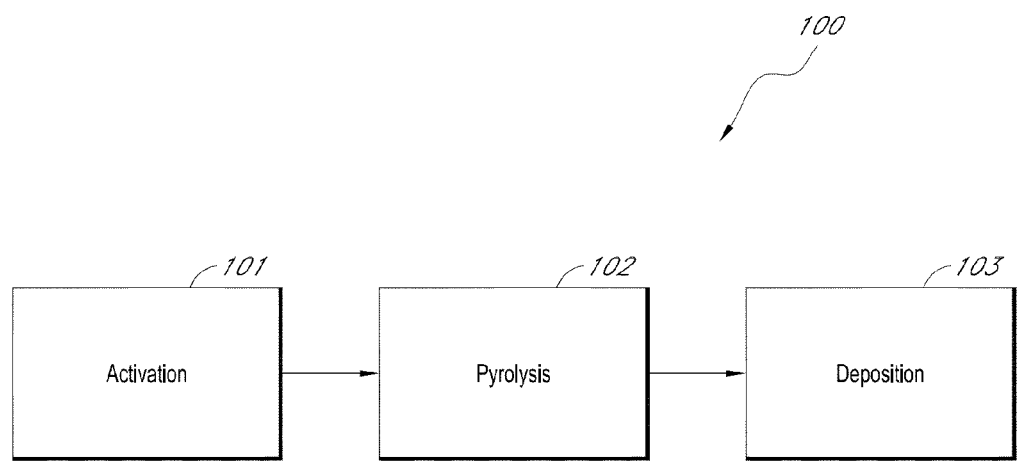
FIG. 3 illustrates one embodiment of a separator deposition process.
Figure 4:
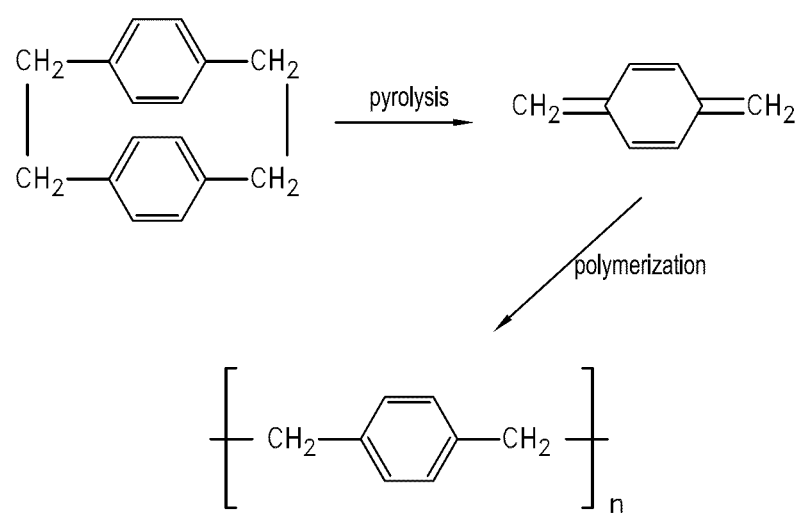
FIG. 4 illustrates pyrolysis of di-para-xylylene to form para-xylylene and subsequent polymerization of para-xylylene.

In some embodiments, the separator is a polymer. In one embodiment, the separator is parylene. The parylene can be any of the various types such as for example parylene N, parylene C, parylene D, parylene F, etc. As illustrated in FIG. 3, gas phase deposition 100 of the polymer can be done by first activating, block 101, a dimer such as di-para-xylylene 201 as illustrated in FIG. 2. Activation can be performed at about 170 to 200° C. so that the dimer vaporizes (e.g. sublimation). The vaporized dimer then is cleaved by pyrolysis, block 102, to form monomers such as para-xylylene 202 as illustrated in FIG. 2. Cleaving of the dimer can be done in a pyrolysis furnace at about 600 to 700° C. and typically at about 675° C. The monomer is then deposited, block 103, on a substrate surface and can chemically react with other monomers to form a polymer such as poly-para-xylylene 203 as illustrated in FIG. 4. Advantageously, depositing the separator allows the substrate (e.g. electrode) to have complex shapes. Examples of parylene deposition techniques are discussed in J. B. Fortin et al., "A Model for the Chemical Vapor Deposition of Poly(para-xylylene) (Parylene) Thin Films," Chem. Mater. 2002, 14, 1945-1949 and U.S. Pat. No. 6,946,406.

The parameters of deposition can be adjusted to change the porosity and uniformity of the deposited separator. The separator should be sufficiently porous so that ions can pass through the separator once wet with, for example, a liquid or gel electrolyte. Alternatively, the separator could absorb the electrolyte through a gelling or other process even without significant porosity. In one embodiment, the separator does not have significant porosity, but can be gelled or otherwise absorb a liquid electrolyte. In another embodiment, the separator has no porosity, but can be gelled or otherwise absorb a liquid electrolyte. On the other hand, a porous separator should also not be too porous to allow the anode and cathode to transfer electrons through the separator. To deposit a porous polymer layer, a number of techniques can be used. For example, oblique angle deposition techniques (e.g. glancing angle deposition) can be used to form a columnar structure. Another technique involves depositing with the substrate at relatively low temperatures (e.g. below room temperature). Examples of depositing Parylene-N films at liquid nitrogen temperatures are discussed in J. Erjavec et al., "Novel Parylene-N films deposited at liquid nitrogen temperatures," Materials Letters 39 (1999) 339-342. Other parameters of the deposition process can be adjusted such as the composition of the deposited polymer and the deposition temperature. The composition and/or deposition temperature can be varied during deposition. Deposition temperatures can include for example, atmospheric temperature, substrate temperature, pyrolysis temperature, etc. In one embodiment, at least one deposition temperature is raised during deposition, and in another embodiment, at least one deposition temperature is lowered during deposition. The atmosphere in the deposition chamber can also be adjusted. For example, the level of vacuum or the amount of pressure can be adjusted. In one embodiment, deposition is done in a relatively low pressure (e.g. vacuum or below atmospheric pressure). In some embodiments, a gas is used. In one embodiment, the gas in the chamber can be a relatively inert gas (e.g. argon). In some embodiments, the deposition pressure is relatively high (e.g. above atmospheric pressure). In additional embodiments, the deposition rate is adjusted. In one embodiment, the deposition rate is increased during deposition, and in another embodiment, the deposition rate is decreased during deposition.

In some embodiments, more than one component are deposited together. A method of making a battery separator can include gas phase depositing a composition onto an electrode. The composition can include a first component selected from the group consisting of polymers, dimers and monomers, a second component selected from the group consisting of polymers, dimers and monomers, and the first component being different than the second component. The first component and the second component each form separate polymer phases and together form a layer. In one embodiment, the concentration of one component is higher than another component. In some embodiments, the concentration of a component is varied relative to another component during deposition. In some embodiments, one or more components can be monomers. In one embodiment, both monomers are cleaved at similar temperatures so that the monomers can be formed in the same step. In another embodiment, the monomers can be cleaved in separate steps and mixed during deposition. Parylene, in some embodiments, can be deposited with dibenzyl or stilbene. Parylene, dibenzyl and stilbene all cleave at similar temperatures. In one embodiment, concentration of parylene is lower than dibenzyl or stilbene. In another embodiment, concentration of parylene is higher than dibenzyl or stilbene. In certain embodiments, a method includes activating a first dimer and pyrolysing the first dimer to form the first component, and activating a second dimer and pyrolysing the second dimer to form the second component. After deposition, one of the two deposited components can be removed to form a porous polymer layer. In certain embodiments, a method includes removing at least a portion of the second component to form a porous separator layer. For example, the component to be removed can be dissolved in a solvating solution and/or removed by other chemical or mechanical processes. Alternatively, the pressure around the components can be increased (e.g. decrease vacuum). In one embodiment, dibenzyl or stilbene is removed to leave a parylene porous separator. An example of depositing two different monomers to form a porous layer is discussed in United States Patent Publication No. 2006/0046044.

In further embodiments, a method of making a battery separator includes gas phase depositing a composition onto an electrode. The composition can include a first component selected from the group consisting of polymers, dimers and monomers. In another embodiment, only one dimer type is used. The method can include forming a first polymer from the first component to form a layer comprising the first polymer and a second component selected from the group consisting of by-products and remaining portions of the first component from the forming the first polymer. During pyrolysis of the dimers, not all dimers are cleaved to form monomers and/or monomers further decompose into by-products. The dimers and by-products deposit with the monomers. The method can include removing at least a portion of the second component to form a porous separator layer. For example, the deposited layer can be subsequently heat treated to release the dimers and by-products to form a porous structure. Examples of forming porous layers are discussed in Y. S. Yeh et al., "Polymerization of Para-xylylene Derivatives" J. Polymer Sci.: Part B: Polymer Physics, Vol. 28, 545-568 (1990). In one embodiment, the pyrolsis temperature is relatively high (e.g. above about 675° C.). In another embodiment, the pyrolsis temperature is relatively low (e.g. below about 675° C.).

In some embodiments, a template approach can be used. A porous template layer can be deposited on a substrate. A method of making a battery separator can include forming a first layer onto an electrode, the first layer includes a porous template, and gas phase depositing a first component into the porous template. The porous template can be a removable material. The first component can be selected from the group consisting of polymers, dimers and monomers. A polymer such as parylene can be used to fill the porosity in the porous template layer. The method can further include removing at least a portion of the porous template to form a porous separator layer comprising the first component. For example, the porous template layer can then be removed leaving a porous polymer layer. In some embodiments, the template layer is removed with a solution. In other embodiments, the template layer is removed by evaporation. The porous separator should substantially remain after removal of the template layer.

Figure 5:
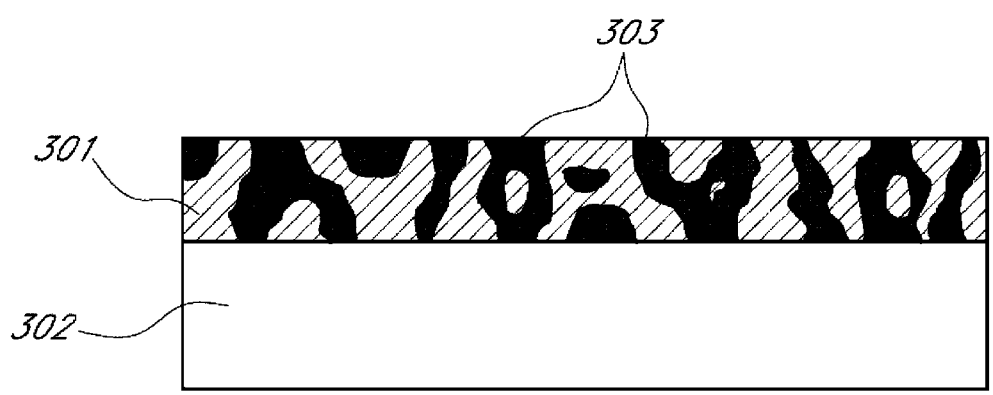
FIG. 5 illustrates a porous separator deposited on a substrate.

In one embodiment, the porous separator has an open cell structure. The open cell structure allows ions to transfer through the porous separator. An illustration of porous structure is shown in FIG. 5 where a porous separator 301 is deposited on a substrate 302 and has porosity 303. Preferably, a porous separator has a conformal thickness. The porous separator should have a sufficiently conformal thickness such that the electrochemical potential across the porous separator is substantially uniform. The overall thickness of the porous separator can also be selected based on properties and porosity of the separator.

Figure 6:
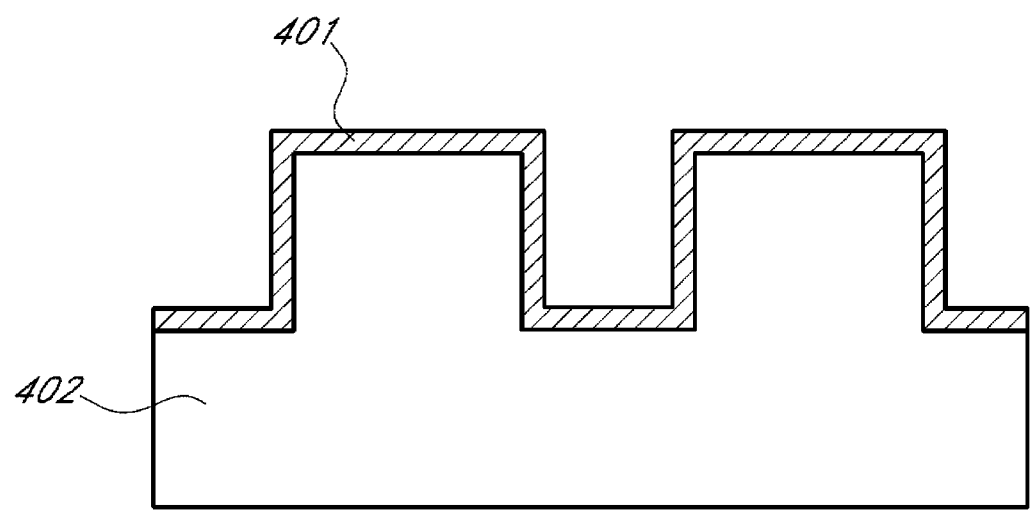
FIG. 6 illustrates a conformal porous separator deposited on a non-planar substrate.

An advantage of depositing a porous separator onto an electrode (e.g. cathode or anode) is that the electrode can have complex shapes. For example, FIG. 6 illustrates a conformal porous separator 401 deposited on non-planar substrate surface 402. Advantageously, the deposition techniques described above can be used to produce a conformal porous separator or a substantially conformal porous separator. In certain embodiments, the porous separator can have a substantially uniform thickness.

In certain embodiments, the electrode includes cavities (e.g., grooves, pores, and pits) and/or protrusions (e.g. bumps and ridges). A separator made from a film material may not be able to contact the electrode inside of the cavities and may not be able to contact the electrode on the protrusions and valleys or depressions between protrusions. Advantageously, gas phase depositing a separator can deposit the separator onto the surfaces within the cavities and onto protrusions and valleys. For example, a separator can be gas phase deposited onto a rough surface or a surface with rigosity. In some embodiments, a battery electrode and separator includes a substantially conformal separator layer gas phase deposited onto a surface of the at least one cavity or protrusion. In certain embodiments, the cavity or protrusion has a length of at least about 5 mils (127 µm) or a length of about 5 mils (127 µm) to about 100 mils (2.54 mm). The cavity or protrusion can also have a width. Furthermore, the width may be oblong. For example, the cavity or protrusion can have a first width larger than a second width such as, for example, a groove or ridge. In certain embodiments, the cavity or protrusion has at least one width that is less than about 100 mils (2.54 mm), at lest one width that is less than about 5 mils (127 µm), or at least one width that is about 1 mil (25.4 µm) to about 5 mils (127 µm). In further embodiments, the length is larger than at least one width of the cavity or protrusion. In certain embodiments, the cavities or protrusions have a smallest dimension less than 5 mils (127 µm) or between about 1 mil (25.4 µm) to about 5 mils (127 µm). The smallest dimension can include, for example, the at least one width or the length. In some embodiments, a substantially planar surface includes cavities in or protrusions on the surface.

Many additional deposition techniques can also be used to make a porous separator. In one embodiment, the porous separator is deposited by atomic layer deposition (ALD). Deposition by ALD has two or more precursors. A first precursor and a second precursor can be deposited in series. The deposition of the first precursor is self-limiting due to a self-terminating surface reactions resulting in a single layer of the first precursor. A second precursor is deposited on the first precursor. The deposition of the second precursor is also self-limiting resulting in a single layer of the second precursor. Deposition of the first precursor and the second precursor can be repeated to produce a multi-layered structure comprising alternating layers of the first precursor and the second precursor. Typically, the deposition chamber is purged between deposition of the first precursor and deposition of the second precursor. An advantage of ALD is that the layer thickness can be substantially conformal. In some embodiments, the layer thickness is substantially atomically conformal. Typical materials that can be deposited by ALD are oxides, metal nitrides, metals and metal sulfides. In some embodiments, ALD is used to deposit on and/or in a porous template layer. The porous template layer can subsequently be removed to leave an ALD deposited porous separator.

In one embodiment, the porous separator is deposited by plasma deposition. For example, silicon oxide (e.g. $SiO_x$) can be plasma deposited. A composition is injected into plasma. The composition can include one or more precursors. The precursor can be mixed with a gas before or during injection into the plasma. In some embodiments, the gas can be a relatively inert gas (e.g. argon). The precursor can be, for example, Bis(trimethylsilyl)amine (e.g. hexamethyldisilazane or HMDS) or Bis(trimethylsilyl) oxide (e.g. Hexamethyldisiloxane or HMDSO). The plasma ionizes (e.g. dissociates) the precursor. The dissociated precursor can then be deposited onto a substrate. An example of plasma deposition is discussed in J. Schafer et al., "Local deposition of $SiO_x$ plasma polymer films by miniaturized atmospheric pressure plasma jet (APPJ)," J. Phys. D: Appl. Phys. 41 (2008) 194010. In some embodiments, two or more precursors are introduced into the plasma together or sequentially. After the precursors are deposited, one or more precursors can be removed. The precursors to be removed can be dissolved in a solvating solution and/or removed by other chemical or mechanical processes. The remaining one or more precursors form a porous structure. In one embodiment, the composition injected into the plasma includes a concentration of one precursor greater than another precursor. In one embodiment, the concentration of the precursor to be removed is greater than the concentration of the precursor that will remain as the porous separator. In other embodiments, the concentration of the precursor to be removed is less than the concentration of the precursor that will remain. In another embodiment, the precursors are in equal concentrations. In one embodiment, the composition and/or deposition temperature is varied during the plasma deposition. For example, at least one deposition temperature is raised during deposition, and in another example, at least one deposition temperature is lowered during deposition. The atmosphere in the deposition chamber can also be adjusted. For example, the level of vacuum or the amount of pressure can be adjusted. In one embodiment, deposition is done in a relatively low pressure (e.g. vacuum or below atmospheric pressure). In some embodiments, the deposition pressure is relatively high (e.g. above atmospheric pressure). In additional embodiments, the deposition rate is adjusted. In one embodiment, the deposition rate is increased during deposition, and in another embodiment, the deposition rate is decreased during deposition. In some embodiments, plasma deposition is used to make a porous template layer. In other embodiments, plasma deposition is used to deposit on and/or in a porous template layer.

In one embodiment, the porous separator is deposited by a droplet spray. The droplet spray can be airless or include air. In one embodiment, the size of the droplets are about 3 to 4.2 µm. In another embodiment, the size of the droplets are less than about 5 µm. In a further embodiment, the size of the droplets are small enough to get into topographical features of a substrate.

In one embodiment, the porous separator is produced by depositing and foaming a composition. In some embodiments, a method of making a battery separator includes gas phase depositing a composition onto an electrode. The composition comprises a precursor and a foaming agent. Deposition of the composition can be by, for example, thermal vapor deposition. The composition can include one or more precursors. In one embodiment, the precursor is a monomer. For example, the monomer can be a cyanoacrylate (e.g. ethyl-2-cyanoacrylate), methyl methacrylate (MMA), methyl vinyl ether or ethyl vinyl ether. In some embodiments, only one type of monomer is used as the precursor. In other embodiments, more than one type of monomer is used as the precursor. The composition can also include a solvent that the monomer can be dissolved in. For example, cyanoacrylate can be dissolved in ethereal solvents (e.g. tetrahydrofuran (THF)). In some embodiments, the composition includes a foaming agent. Foaming agents can include pentane, hexane, 1,1,2-trichlorotriflouroethane, cyclohexane, petroleum ether, diethyl ether, etc. The method can include evaporating the foaming agent to foam the precursor, and polymerizing the precursor to form a porous separator layer. Foaming of the composition can be done during or after deposition of the composition. For example, the deposition and foaming can be done in the same chamber or different chambers. In some embodiments, an initiator polymerizes the monomer. Initiators can include $H_2O$, N,N-dimethyl-p-toluidine, N-(oxydiethylene)benzothiazole-2-sulfenamide, etc. Introduction of the initiator to the composition can be done during deposition or after deposition of the composition. In addition, the initiator can be introduced in the same chamber as the deposition or in a different chamber.

In some embodiments, the polymerization of the monomer creates heat which causes the foaming agent to evaporate resulting in foaming. In some embodiments, a separate heat source heats the composition to cause the foaming agent to evaporate. In other embodiments, a vacuum is pulled to cause the foaming agent to evaporate. Further polycyanoacrylate foaming details are discussed in International Publication No. WO 92/09651 and U.S. Pat. No. 7,323,207. In one embodiment, the composition has a concentration of precursor greater than a concentration of foaming agent. In other embodiments, the composition has a concentration of foaming agent greater than of precursor. In a further embodiment, the precursor and foaming agent are in equal concentrations. In some embodiments, the foaming process produces a substantially conformal porous separator. In further embodiments, the foamed porous layer is an open-porous structure.

Some polymers may dissolve in typical battery electrolytes. Cross-linking the polymer can improve the polymer's ability to resist dissolving in battery electrolytes. Cross-linking can also add mechanical stability. However, too much cross-linking may inhibit ion conduction. Double-functional chemicals can be used for cross-linking. For example, N,N-methyl-bisacrylamide can be used to cross-link polycyanoacrylate. Other cross-linking agents (e.g. double-, triple-, and other functional groups) include 1,6-Hexanediol Diacrylate, trimethylolpropane triacrylate, ethylene glycol dimethacrylate. A radical initiator (e.g. radical catalyst) can be used along with a cross-linking agent to improve cross-linking. Radical initiator examples include butanone peroxide and benzoyl peroxide. An amine activator, for example N,N-dimethyl-p-toluidine, may be used in combination with radical initiator for initiating polymerization. To improve cross-linking, a stabilizer may be used in some embodiments to prevent anionic initiation. For example, stabilizes can include acids. Further examples of cross-linking agents, radical initiators, amine activators and stabilizers are discussed in U.S. Pat. No. 3,940,362. In one embodiment, a polymer is produced using a mixture of monomer and cross-linking agent. In further embodiments, a polymer is produced using a mixture of monomer, cross-linking agent and radical initiator. In other embodiments, a polymer is produced using a mixture of monomer, cross-linking agent, radical initiator and amine activator. In one embodiment, the mixture includes MMA, a crosslinking agent (e.g. 1,6-Hexanediol Diacrylate, trimethylolpropane triacrylate, ethylene glycol dimethacrylate), radical initiator (e.g. benzoyl peroxide) and amine activator (e.g. N,N-dimethyl-p-toluidine). In some embodiments, the ratio of MMA to crosslinking agent is between about 8 to 1 and about 1 to 1. In some embodiments, the radical initiator and the amine activator are each about 5 percent of the mixture.

Polymerization systems may be radical initiation systems or cationic polymerization systems. Mixtures that include cyanoacrylate or MMA are radical initiation systems. Cationic polymerization systems include methyl vinyl ether or ethyl vinyl ether as the monomer. Cationic polymerization systems can also include a cross-linking agent (e.g. divinyl ether of ethylene glycol) and an initiator (e.g. $BF_3$).

In one embodiment, the foamed porous layer can be used as a template for the porous separator. The porosity of the foamed porous layer can be filled with a material that will be the porous separator. After the foamed porous layer is filled with the material, the foamed porous layer is removed. For example, the foamed porous layer can be chemically or mechanically removed.

Various embodiments have been described above. Although the invention has been described with reference to these specific embodiments, the descriptions are intended to be illustrative and are not intended to be limiting. Various modifications and applications may occur to those skilled in the art without departing from the true spirit and scope of the invention as defined in the appended claims.

What is claimed is:

1. A battery component comprising:
   an electrode; and
   a separator deposited on a surface of the electrode, wherein the separator comprises a porous poly(para-xylylene) film, wherein the porous poly(para-xylylene) film has an open cell structure.

2. The battery component of claim 1, wherein the separator is a substantially conformal layer.

3. The battery of claim 1, wherein the electrode comprises a material that reacts with or absorbs ions.

4. The battery of claim 1, wherein the electrode comprises carbon.

* * * * *